3,540,025
ICE DETECTOR
Berton P. Levin, Studio City, and Clark I. Bright, Encino, Calif., assignors to The Sierracin Corporation, Sylmar, Calif., a corporation of California
Filed Jan. 20, 1967, Ser. No. 610,667
Int. Cl. G08b 21/00
U.S. Cl. 340—234                                 4 Claims

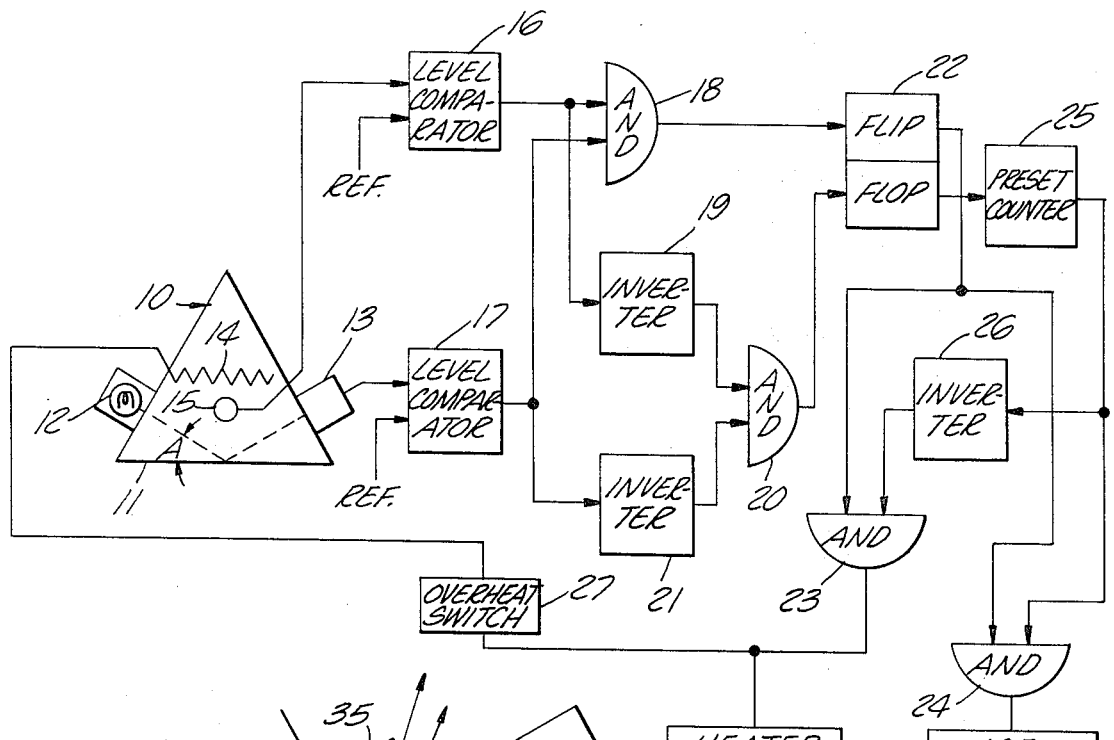
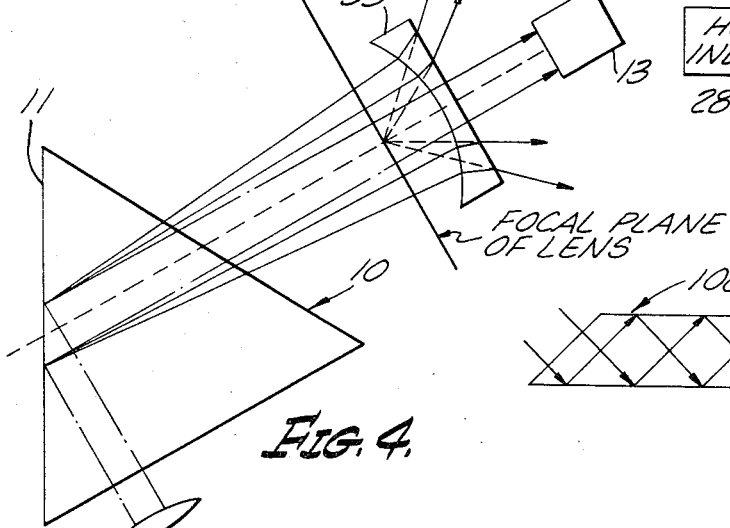
FIG. 4.
FIG. 2.
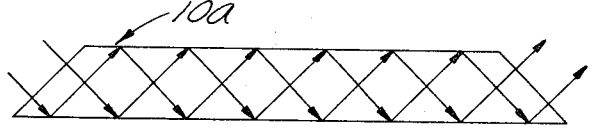
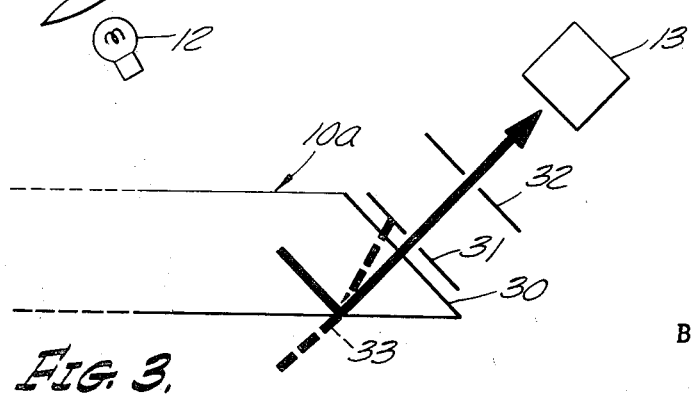
FIG. 3.
BERTON P. LEVIN
CLARK I. BRIGHT
INVENTORS.
BY Lyon & Lyon
ATTORNEYS United States Patent Office 3,540,025
Patented Nov. 10, 1970

ABSTRACT OF THE DISCLOSURE

A total internal reflection type of ice detector for aircraft or the like together with logic circuitry for discriminating against signals caused by conditions other than icing. The detector includes a prism having at least one surface on which ice or other foreign matter may be deposited. Light sensing means sense light internally reflected in said prism. A sensor is provided for sensing the temperature of the prism, as is a heater for raising the temperature of the prism upon a command from logic circuitry. The circuitry itself detects and compares with a reference the temperature of the prism and output of light sensing means and performs various logical operations on the resultant signals, giving an indication when the foreign matter deposited on the prism is ice. This is accomplished by providing a sensor for sensing the temperature of the prism and a heater for raising the temperature of the prism upon a command from the logic circuitry. The circuitry itself detects and compares with a reference the temperature of the prism and output of the photodetector and performs various logical operations on the resultant signals, giving an indication when the foreign matter deposited on the prism is ice.

BACKGROUND OF THE INVENTION

This invention relates to apparatus for detecting the formation of ice or the deposition of other foreign matter on a surface.

In U.S. Pat No. 2,359,787 to Peters et al. a prism is provided and serves in the absence of any ice on a surface of the prism to totally reflect the light emanating from a lamp into a photocell. As long as the photocell is receiving an amount of light above a predetermined level, an electrical circuit is maintained inactive. However, when ice forms on the surface of the prism, the critical angle of reflection is changed because of the different medium at the boundary, that is, ice instead of air. According to the patent, this change in medium at the boundary of the prism will result in the light from the lamp no longer being reflected at this boundary but rather it will proceed on to the boundary of the ice and the air where it will be reflected or will pass through this boundary into the air. In either event the photocell no longer receives the light with the result that the electric circuit is actuated and an indication given of the ice formation.

The Peters et al. system has several shortcomings which render it impractical for actual use on an aircraft or the like. First, in the Peters et al. system no protection is afforded from the reception by the photocell of ambient light passing through an ice film and the prism, thus making it possible that no indication is given although an ice film is present. Furthermore, in the absence of an ice deposit, ambient light such as sunlight, can enter the prism and reach the photocell. This condition can seriously affect the operation of the photocell and sequential electronics by, for example, saturating the detector; thus the system reliability is impaired. Second, the Peters et al. system provides no means for discriminating between the formation of an ice film and the formation or deposition of some other foreign material on the surface of the prism. For example, if grease, dirt, or an insect was deposited on the surface where the reflection takes place, the boundary conditions would be changed and the system would probably indicate the presence of ice. It can thus be seen that the Peters system is unreliable as it might indicate the presence of ice when none is present or it might indicate that no ice is present when in fact it is.

BRIEF SUMMARY OF THE INVENTION

The present invention overcomes the problems just discussed by providing an optical system that will pass to a photodetector only those rays emanating from the light source of the system, that is, it will eliminate the possibility of any ambient light reaching the photodetector. The present invention also provides logic circuitry for differentiation between ice and any other foreign material deposited or formed on the surface of a prism. This is accomplished by providing a sensor for sensing the temperature of the prism and a heater for raising the temperature of the prism upon a command from the logic circuitry. The circuitry itself detects and compares with a reference the temperature of the prism and the output of the photodetector and performs various logical operations on the resultant signals, giving an indication when the foreign matter deposited on the prism is ice.

It is therefore an object of the present invention to provide a detector that is reliable and produces an indication when a substance whose presence is desired to be known is formed or deposited as distinguished from other foreign matter that may be formed or deposited.

BRIEF DESCRIPTION OF THE DRAWING

FIG. 1 is a schematic diagram of the ice detector of the present invention;

FIG. 2 shows a modification of the prism shown in FIG. 1;

FIG. 3 shows a preferred prism-detector arrangement for use in the present invention; and FIG. 4 shows a modification of the arrangement of FIG. 3.

DESCRIPTION OF THE INVENTION

Before describing the details of the present invention, it is believed that a discussion of the principles of operation of the invention would be helpful. When a beam of light strikes a material boundary such as a glass-air boundary at the surface of an optical element from the side of greater index of refraction and at an angle with respect to the normal greater than the critical angle, then substantially total internal reflection of the rays occurs. Representing the light beam by a wave of indefinite extent in space and time, the amplitude of the wave in the rarer medium can be shown to fall off exponentially. However, when denser matter is placed sufficiently close to the boundary, energy, which would otherwise undergo total internal reflection, is drained off in the form of light proceeding in the second medium. Thus, when the boundary conditions are altered by the presence of a dense material in the rarer medium close to the boundary, the intensity of the internally reflected beam falls off.

This principle is utilized as the basis for an ice detector according to the present invention by arranging a light source, preferably monochromatic, and an optical element such as a roof-prism in such a manner that the light from the source is totally internally reflected. An additional example of a suitable optical element is a so-called optical fiber or light pipe of an optically clear material and of such small cross-section diameter compared to length that it is quite flexible and hence can be disposed in a geometry where several bends are required.

A light source provided at one end of the light pipe and a photodetector at the other end can be arranged so that a great number of internal reflections occur along the length of the light pipe. With such an arrangement extensive spatial coverage can be achieved. The surface of the optical element at which total reflection occurs is disposed so that ice formation will occur at the point of total internal reflection. The ice deposit at this surface will alter the boundary conditions required for total internal reflection by virtue of the fact that the refractive index of ice is 1.309–1.313. This will result in energy being drained through the glass-ice boundary, thus reducing the intensity of the internally reflected beam. The intensity of the internally reflected beam is monitored with a suitable photodetector, the presence of ice on the face of the optical element being indicated by a detectable decrease in intensity.

For the case of light incident upon the boundary at less than the critical angle, total internal reflection does not occur; however, there will be a partial reflection from the boundary, owing to the discontinuity in refractive index. This is the so-called Fresnel reflectance and can serve as the basis for a detector of ice or other material deposits for which the refractive index differs sufficiently from that of the optical element. Even for angles of incidence almost perpendicular to the boundary the Fresnel reflectance can be used in this manner. The magnitude of the reflectance R is given by $$R = \left(\frac{n_a - n_b}{n_a + n_b}\right)^2$$

where $n_a$ and $n_b$ are the refractive indices on either side of the boundary. When the boundary is a glass/air boundary $n_a = 1.5$ and $n_b = 1.0$, nominally, so the reflectance is approximately 4 percent. Deposition of a material on the glass surface will result in $n_b$ greater than one, thus changing the reflectance to a value different from the nominal 4 percent, and this change can be employed as a detection means. This approach can be implemented with essentially the same apparatus and basic configuration as the total internal reflection approach to be described hereinafter.

An additional refinement of the partial internal reflection approach is the selection of radiation pervious member, radiation source, and radiation detector combination to permit operation at a wavelength which is strongly absorbed by the material which is to be deposited or of which deposition is to be detected. At such strongly absorbed wavelengths, the refractive index of the deposit material assumes very large values.

While the arrangement described will detect the presence of an ice film, various other foreign materials such as bugs, water, grease or the like can also be deposited on the surface of the prism and cause a decrease in the light intensity. To avoid erroneous signals due to water deposit on the prism, the prism is provided with a temperature sensor which must indicate a prism temperature suitable for freezing before the decrease in light signal is permitted to actuate an icing indicator.

Before describing the manner in which decreases in light intensity due to other foreign matter are discriminated against, definitions of such foreign matter are in order. For purposes of this description, grease is defined as material such as grease, jet aviation fuel or gasoline which can reduce the reflected light intensity but which will volatilize off the prism when the prism is heated. For the purpose of this description, dirt is defined as a deposit which can reduce the reflected light intensity but which cannot be driven off by heating the prism. The term dirt thus includes dirt, insects, birds, and the like.

As used herein, the term "indicate" is not used in any narrow sense but rather is intended to include any manifestation that an event or condition has occurred and is specifically meant to include both indications perceptible by the senses and indications such as electrical signals useful for actuating electrical or mechanical systems or apparatus.

In order to discriminate against a decrease in reflected light intensity caused by grease, the prism is provided with a heater which, when energized, raises the temperature of the prism surface. This elevated temperature will volatilize any grease on the prism surface which may be causing a decrease in light intensity. Until the heater is energized the system cannot distinguish between an ice deposit and a grease deposit at below freezing temperatures. If ice is deposited on the prism face when the heater is energized the ice will melt and the resulting water droplets will be driven off by the air stream. Thus, whether there is ice or grease on the prism, energizing the heater will drive off both, restoring the prior level of the reflected light intensity and producing an above-freezing signal from the temperature sensor. In other words, the system is restored to its previous state and is ready to detect a further deposition on the prism face. At this point the system can be said to have completed one count.

The system is designed so that a predetermined number of complete counts must be performed before an icing condition is indicated. That is, if an initial deposit on the prism reduces the light signal, and if the temperature sensor indicates below freezing, then the heater is energized. The deposited material is then removed (if it is ice or grease) and one count is completed. Under icing conditions, when the heater is deenergized, the prism will cool again and ice will again be formed. Then the heater is again energized and a second count is completed. If, in a system with a predetermined count number of three, a third deposit is formed, and then a fourth, as indicated by a drop in intensity of the reflected light beam and prism temperature, then ice is indicated. A warning device or de-icing apparatus is then actuated. Of course, occurrence of a single count can be used to actuate the warning device, and the actual number chosen should strike the best possible balance between reliability and speed of response.

If dirt is deposited on the prism surface, the intensity of the reflected light will fall but this will be registered as a possible ice condition only if the temperature sensor indicates below freezing. If the dirt is deposied at below freezing temperatures, the cycle described above is initiated and the heater is actuated. However, by definition, the dirt will not be removed from the prism during the heating cycle and thus the system will not be able to complete one count and no indication will be given.

The invention could be used to detect the presence of substances other than ice. For example, in a chemical process wherein the persistent presence of a gas or vapor would indicate the existence of a condition requiring that some action be taken, the optical element could be maintained at an ambient temperature such as to cause condensation of the gas or vapor. As in the case of ice, an output caused by random condensation or deposition of some other volatizable material would be discriminated against by the repetition requirement of the present invention. Reduction of the reflected light due to dirt would be prevented from producing an output in the same manner while a rise in ambient temperature to above the condensation point would also prevent the production of an output signal.

Turning now to FIG. 1, there is shown the circuitry for performing the operations described above.

An optical element such as a prism 10 has a surface 11 on which ice or other foreign matter may be deposited. This surface may, for example, be flush with the surface of an air foil. A light source 12 is arranged relative to the prism 10 so that the light emanating therefrom is totally reflected at the surface 11 into a suitable photodetector 13. The angle A at which the light from the source 12 impinges on the surface 11 is, of course, greater than the critical angle so that total internal reflection of the rays occurs. The prism is also provided with a heater 14 and a temperature sensor 15 which may, for example, be a thermocouple. The heater 14 and sensor 15 may be positioned internally in the prism or closely externally associated therewith.

The output of the temperature sensor 15 is applied to a level comparator 16 which also receives a predetermined reference signal from any suitable source. When the temperature of the prism is 32° F. or below, the output from the sensor 15 is below the reference level and the output from the level comparator 16 is TRUE, while if the temperature detected is above freezing the output of the comparator 16 is FALSE.

The intensity of the reflected light beam is detected by the photodetector 13 which produces an output signal which is applied to a level comparator 17. The level comparator 17 also receives a predetermined reference signal. If foreign matter has been deposited on the surface 11 of the prism 10, the output from photodetector 13 is below the reference level and the level comparator 17 is arranged to have an output which is TRUE. If no deposition has taken place, the output of the comparator 17 is FALSE.

The output of the level comparator 16 is fed to one input of an AND gate 18 and is also fed into an inverter 19, the output of which is connected to one input of an AND gate 20. The output of the level comparator 17 is fed to the other input of the AND gate 18 and to an inverter 21, the output of which is fed to other input of the AND gate 20. The output of the AND gate 18 is connected to the set input of flip-flop 22 while the output of the AND gate 20 is fed to the reset input of this flip-flop.

The set or TRUE output of the flip-flop 22 is connected to one input of an AND gate 23 and to one input of an AND gate 24. The reset or FALSE output of the flip-flop 22 is fed to a counter 25, the output of which is fed to the other input of the AND gate 24, and through an inverter 26, to the other input of the AND gate 23. The output of the AND gate 23 is fed to the heater 14 through an overheat switch 27 and to a heater indicator 28. The output of the AND gate 24 is connected to an ice indicator 29. The ice indicator 29 may be a warning device or may be a means for automatically setting in operation a de-icing system.

If the outputs of the level comparators 16 and 17 are both TRUE, that is, when the prism temperature is below freezing and deposition has occurred, the signal from the AND gate 18 is also TRUE setting the flip-flop 24 in its TRUE state. This TRUE signal, when existing together with a TRUE output from the inverter 26, causes the AND gate 23 to produce a TRUE output which actuates the heater 14 and the heater indicator 28.

Actuation of the heater 14 causes the temperature of the prism 10 to rise above freezing, thus causing the output of the comparator 16 to change to FALSE. Similarly, the output of the comparator 17 changes to FALSE if the material deposited on the surface 11 is driven off as a result of the rise of the temperature of the prism 10. The FALSE output from the level comparator 16 is passed to the inverter 19 which accordingly produces a TRUE output and applies it to the AND gate 20. Similarly, if the output of the level comparator 17 is FALSE, the output of the inverter 21 is TRUE and consequently the AND gate 20 produces a TRUE output. This causes the flip-flop 22 to be reset to its FALSE state, whereby deactivating AND gate 23 and turning off the heater 14. The resetting of the flip-flop 22 also produces a signal which is fed to the counter 25 and recorded as one count in the counter.

The prism 10 is again cooled below freezing and if ice is deposited on the surface 11 another cycle identical to that just described occurs. This continues until the number of cycles recorded by the counter 25 equals the number to which it is preset, for example, three. At that time, the output of the counter 25 changes from FALSE to TRUE. This results in the output of the inverter 26 changing from TRUE to FALSE with the result that the AND gate 23 is deactivated and remains so regardless of the state of the flip-flop 22. The heater 14 is thus again turned off.

Ice is now once again deposited on the surface 11 of the prism 10. In the manner previously described, this causes the output of the flip-flop 22 to be TRUE. Now, both inputs of the AND gate 24 are TRUE and hence its output is TRUE, energizing the ice indicator 29. The system will remain in this condition until there occurs a change in external conditions, that is, when the temperature rises above freezing causing the deposited ice to melt. When this occurs, the flip-flop 22 will be reset as before. In the conventional manner this reset output of the flip-flop 22 causes the preset counter 25 to be recycled so that its output changes from TRUE to FALSE and the ice indicator 29 is deenergized. The system is now ready to again begin the entire ice detecting sequence.

Of course, if the material deposited was dirt, the just described sequence of events does not occur because the actuation of the heater 14 does not cause a change in the light intensity detected by the detector 13 and thus the output of the level comparator 17 does not change from TRUE to FALSE. Consequently, the AND gate 20 cannot produce a TRUE output and thus the flip-flop 22 cannot be reset or a count entered into the counter 25.

The overheat switch 27 is not a necessary part of the system of the present invention but it is included as a safety device to prevent inadvertent overheating of the prism 10 by the heater 14.

If a continuous indication of icing is desired, the AND gate 23 and inverter 26 can be eliminated and the TRUE output of the flip-flop 22 connected directly to the heater 14 and heater indicator 28. In such event, the operation of the remainder of the system will remain the same, that is, the ice indicator 29 will be actuated when the predetermined number of counts has occurred. However, at that time the heater 14 and heater indicator 28 will not be disabled, but will continue to be cycled. This will give the observer an indication that the icing condition is still present and that ice is still being deposited. The rate at which the heater indicator 28 is actuated is proportional to the rate of icing and thus will also give the observer an indication of this rate of icing, that is, the severity of the icing conditions. If desired, this rate information can also be developed in a more precise manner, for example, by connecting the TRUE output of the flip-flop 22 to a suitable frequency to voltage converter and suitably calibrating a voltmeter connected to the output of the converter.

FIG. 2 shows a prism 10a of a type which may be used in place of the single reflection prism shown in FIG. 1. This prism 10a is so constructed that multiple reflections of the light beam occur within the prism. This feature increases the sensitivity of the optical system to the deposition of the material by a factor roughly equivalent to the number of reflections, here shown as four.

FIG. 3 illustrates one manner in which the detection of ambient light refracted into the prism is eliminated. Adjacent the exit face 30 of the prism 10a are positioned direction defining stops 31 and 32 which narrowly define the direction of the light beam entering the detector 13 from the prism 10a. This direction is selected to be at greater than the critical angle for light inside the prism 10a. By the definition of the critical angle, light travelling in this direction can do so only by having undergone total internal reflection beforehand, that is, it must originate inside the prism. In this way, the detector canot be irradiated by ambient light outside the prism such as that indicated by dotted line 33. The provision of the stops 31 and 32 thus ensure that when foreign matter is deposited on the prism this fact will be reliably indicated to the detector 13.

Other means of narrowly restricting the angle of the light internally reflected from the optical element surface will serve as means for achieving insensitivity to ambient light. A further example of such an angle-restricting means is shown in FIG. 4. In this figure, a negative lens 35 of short focal length is located in front of the photodetector. This lens receives the collimated beam internally reflected from the optical element surface and diverges the light rays to form a virtual image at the focal plane. This divergence of the light rays composing the collimated beam will cause all but the more paraxial rays to miss the photodetector; i.e., only those rays which are on or very nearly on the lens axis will pass through the lens with negligible deviation and thus succeed in irradiating the photodetector. The negative lens is used in this way as an inverse field lens, permitting only rays in a narrowly defined angle to strike the photodetector.

From the foregoing description it can be seen that a detector has been provided that is more reliable and dependable than those heretofore known. In the described embodiment, the detector is arranged so that it produces an indication of ice formation only when in fact ice has been formed and discriminates against the production of an output signal resulting from the deposition of any other foreign material on the prism. While certain prisms have been illustrated, it should be understood that other types of prisms are also suitable for use in the present invention. Similarly, although the logic circuitry preferred by the inventors has been illustrated and described, it will be obvious to those skilled in the art that other arrangements of logical elements could be provided for performing the same operations.

In some cases the cost and complexity of the previously described logic circuitry may be undesirable or economically impractical, for example, in the provision of an ice detector for a light plane. In such an event, the major advantages of the present invention can nevertheless be secured by in effect substituting the pilot or other human intermediary for the logic system. Thus, the optical portion of the present invention could be installed in the wing or other suitable location in the plane and the output of the photodetector 13 fed through a suitable switching system to an indicator lamp in the cockpit. The cockpit could also be provided with means for manually energizing the heater 14. Upon the formation of ice, the amount of internally reflected light would be diminished in the manner described previously and as a result the output of the photodetector 13 would be decreased causing the indicator lamp to be illuminated. The pilot would then actuate the heater 14 raising the temperature of the optical element and driving off the ice, causing the lamp to be extinguished. If the lamp then again was illuminated the pilot would then again actuate the heater and repeat this cycle a sufficient number of times to assure himself that it was ice forming. He could then take appropriate action to alleviate the icing condition. If desired, the output of the temperature sensor 15 could be coupled through a suitable switching system to a second indicator lamp in the cockpit so that the second lamp would be illuminated only when the temperature of the optical element dropped below a predetermined level, for example, the freezing point of water. The pilot would thus know that when both lamps were illuminated for one or more heating cycles, ice was being formed. It would also be possible to control a single indicator lamp in response to the simultaneous occurrence of reduced reflection and low temperature by feeding the outputs of the temperature sensor 15 and photodetector 13 to an AND gate, the output of the AND gate controlling the illumination of the lamp.

The invention may be embodied in other specific forms not departing from the spirit or central characteristics thereof. The present embodiments are therefore to be considered in all respects as illustrative and not restrictive.

We claim:

1. In an ice detector including a prism having at least one surface on which ice or other foreign matter may be deposited, a source of light, light sensing means for producing an electrical output in response to light received thereby, said prism, said source and said light sensing means being arranged such that light produced by said source is internally reflected at said surface into said light sensing means, the magnitude of said internally reflected light being reduced upon the deposition of foreign matter on said surface, and indicator means, the improvement comprising heating means positioned to permit said heating means to raise the temperature of said prism; temperature sensing means positioned to produce an electrical output representative of the temperature of said prism; first comparator means responsive to said output of said light sensing means for producing a first signal when said output is below a predetermined level and a second signal when said output is above said predetermined level; second comparator means responsive to said output of said temperature sensing means for producing a first signal when said output is below a predetermined level and a second signal when said output is above said predetermined level; means responsive to the simultaneous existence of said first signals for energizing said heating means; means responsive to the simultaneous existence of said second signals for disabling said energizing means; means for counting the number of times said heating means are deenergized; and means connecting said counting means to said indicator means, said indicator means being actuated in response to a preselected count being registered in said counting means.

2. The ice detector of claim 1 wherein said energizing means comprises a first AND gate connected to said first and second comparator means for producing an output upon the simultaneous existence of said first signals, and bistable means connected to said first AND gate whereby an output signal from said first AND gate sets said bistable means in a first state.

3. The ice detector of claim 2 wherein said disabling means comprises AND gate means connected to said first and second comparator means for producing an output upon the simultaneous existence of said second signals, said bistable means connected to said AND gate means whereby an output signal from said AND gate means resets said bistable means in a second state.

4. An ice detector comprising a prism having at least one surface on which ice or other foreign matter may be deposited; a source of light; light sensing means for producing an electrical output in response to light received thereby; said prism, said source and said light sensing means being arranged such that light produced by said source enters said prism and strikes said surface at an angle greater than the critical angle whereby all of said light is internally reflected into said light sensing means, the magnitude of said internally reflected light being reduced upon the deposition of foreign matter on said surface; a heater positioned to raise the temperature of said prism; temperature sensing means positioned to produce an electrical output representative of the temperature of said prism; first comparator means connected to said light sensing means and responsive to the output thereof for producing a TRUE signal when said output is below a predetermined level and a FALSE signal when said output is above said predetermined level; second comparator means connected to said temperature sensing means and responsive to the output thereof for producing a TRUE signal when said output is below a predetermined level and a FALSE signal when said output is above said predetermined level; a first AND gate having a first input connected to said first comparator means and a second input connected to said second comparator means, said first AND gate producing a TRUE signal when a TRUE signal exists at both said inputs; a flip-flop having its set input connected to the output of said first AND gate whereby said flip-flop is set to its TRUE state when said first AND gate produces a TRUE signal; a first inverter connected to said first comparator means; a second inverter connected to said second comparator means; a second AND gate having a first input connected to said first inverter and a second input connected to said second inverter whereby said second AND gate produces a TRUE signal when the outputs of said first and second inverter are TRUE, said second AND gate being connected to the reset input of said flip-flop whereby said flip-flop is reset to its FALSE state when said second AND gate produces a TRUE signal; a third AND gate having a first input connected to the TRUE state of said flip-flop; a counter for producing a TRUE signal upon the counting of a preselected number of counts, said counter having its input connected to said FALSE state of said flip-flop whereby said counter counts the number of times said flip-flop is switched to its FALSE state; a fourth AND gate having a first input connected to the output of said counter and a second input connected to the TRUE state of said flip-flop, said fourth AND gate producing a TRUE signal when a TRUE signal exists at both said inputs; indicator means connected to said fourth AND gate and actuated upon production of a TRUE signal by said fourth AND gate; a third inverter having its input connected to the output of said counter and its output connected to a second input of said third gate, said third AND gate producing a TRUE signal when a TRUE signal exists at both said inputs; and means connecting said third AND gate to said heater whereby said heater is energized upon the occurrence of a TRUE signal from said third AND gate.

References Cited

UNITED STATES PATENTS

| | | | |
|---|---|---|---|
| 2,414,786 | 1/1947 | Lincks et al. | 317—22 |
| 2,359,787 | 10/1944 | Peters et al. | 340—234 |
| 3,086,393 | 4/1963 | Silverschotz | 340—234 |
| 3,164,820 | 1/1965 | Hulett | 200—61.04 |
| 3,229,271 | 1/1966 | Frant | 340—235 |
| 3,287,974 | 11/1966 | Ciemochowski | 340—234 |
| 3,305,851 | 2/1967 | Brandtszteter | 340—234 |

DONALD J. YUSKO, Primary Examiner

D. MYER, Assistant Examiner

U.S. Cl. X.R.

244—134; 340—27; 356—136